(12) United States Patent
Kitaguchi et al.

(10) Patent No.: US 9,266,457 B2
(45) Date of Patent: Feb. 23, 2016

(54) BODY STRUCTURE FOR DUMP TRUCK

(75) Inventors: Atsushi Kitaguchi, Tsuchiura (JP); Takayuki Satou, Tsuchiura (JP); Kazunori Ishihara, Tsuchiura (JP); Yasuki Kita, Tsuchiura (JP); Takehito Ikema, Tsuchiura (JP); Tomohiko Yasuda, Tsuchiura (JP); Takashi Sasaki, Tsuchiura (JP); Yoshifumi Nabeshima, Tsuchiura (JP); Hitomi Ooshima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/348,306

(22) PCT Filed: Sep. 29, 2011

(86) PCT No.: PCT/JP2011/005511
§ 371 (c)(1),
(2), (4) Date: Mar. 28, 2014

(87) PCT Pub. No.: WO2013/046271
PCT Pub. Date: Apr. 4, 2013

(65) Prior Publication Data
US 2014/0232134 A1 Aug. 21, 2014

(51) Int. Cl.
B60P 1/28 (2006.01)
(52) U.S. Cl.
CPC .................................... B60P 1/286 (2013.01)

(58) Field of Classification Search
CPC .......... B60P 1/286; B60P 1/283; B62D 33/02
USPC .................. 296/183.2, 183.1, 39.3, 64, 26.11; 298/1 H, 1 R, 17 R, 38, 10, 14, 12; 414/809, 528, 393, 397; 410/130
See application file for complete search history.

(56) References Cited

U.S. PATENT DOCUMENTS 3,462,187 A * 8/1969 Hassler .................... 296/183.2
4,162,096 A 7/1979 Proeschl
(Continued)

FOREIGN PATENT DOCUMENTS

CA 1 238 070 A 6/1988
JP 54-67917 A 5/1979
(Continued)

OTHER PUBLICATIONS

International Search Report dated Feb. 20, 2012 (three (3) pages).
(Continued)

Primary Examiner — Glenn Dayoan
Assistant Examiner — Sunsurraye Westbrook
(74) Attorney, Agent, or Firm — Crowell & Moring LLP

(57) ABSTRACT

Disclosed is a body structure for a dump truck (1) having a body frame (3). The body structure is provided with hinge pins (5) to be located toward a rear of the body frame, a body (2A) to be tiltably disposed on the body frame via the hinge pins and to be adapted to load payload (9), and stiffening members arranged on outer surfaces of the body. The body is constructed at least of a floor board (62a), a front board (62b), side boards (62c), and a canopy (62d). The stiffening members include side-board stiffeners (61) connecting upper portions of elongated joints between the side boards and the front board to portions of elongated joints between the side boards and the floor board. The latter portions are located rearward of positions laterally corresponding to a barycentric position (G) of the payload (9) in a longitudinal direction of the body.

10 Claims, 13 Drawing Sheets

(56) References Cited

U.S. PATENT DOCUMENTS

| | | | | |
|---|---|---|---|---|
| 4,474,404 A | * | 10/1984 | Hagenbuch | 296/182.1 |
| 4,826,233 A | | 5/1989 | Hagenbuch | |
| 5,431,475 A | * | 7/1995 | Perry | 296/183.1 |
| 6,592,171 B1 | | 7/2003 | Hinds | |
| 6,592,172 B2 | | 7/2003 | Fujan et al. | |
| 7,207,621 B2 | * | 4/2007 | D'Amico et al. | 296/183.1 |
| 7,481,483 B2 | * | 1/2009 | D'Amico et al. | 296/183.1 |
| 2005/0253418 A1 | | 11/2005 | Miller et al. | |
| 2008/0067856 A1 | * | 3/2008 | Hagenbuch | 298/17 R |

FOREIGN PATENT DOCUMENTS

| | | |
|---|---|---|
| JP | 59-11981 A | 1/1984 |
| JP | 11-502481 A | 3/1999 |
| WO | WO 96/30223 A1 | 10/1996 |

OTHER PUBLICATIONS

Japanese Office Action dated Apr. 14, 2015 (five (5) pages).

\* cited by examiner

BODY STRUCTURE FOR DUMP TRUCK

TECHNICAL FIELD

The present invention relates to a body structure for a dump truck, which is to be tiltably disposed and to be adapted to load payload thereon.

BACKGROUND ART

As illustrated in FIG. 13, a dump truck 1 as a construction machine is generally provided with a body frame 3, a pair of front wheels 6 rotatably arranged on opposite lateral ends of a front section of the body frame 3, respectively, a pair of rear wheels 7 rotatably arranged on opposite lateral ends of a rear section of the body frame 3, respectively, and a body 2 tiltably disposed on the body frame 3 and adapted to load thereon payload 9 such as earth, sand or crushed stone.

Specifically, the dump truck 1 is provided with hinge pins 5 arranged on the rear section of the body frame 3, and hoist cylinders 4 arranged on the body frame 3 at locations forward of the hinge pins 5 and connecting the body frame 3 and the body 2 with each other. Extension of the hoist cylinders 4 raises the body 2 to an elevated, in other words, "up" position, while retraction of the hoist cylinders 4 lowers the body 2 to a laid, in other words, "down" position while supporting the body 2. Therefore, the payload 9 such as earth, sand or crushed stone is loaded in a heap, for example, by a hydraulic excavator to a height above a payload space of the body 2 in its "down" position, the payload 9 loaded on the body 2 is transported to an intended location, and the body 2 is then brought from the "down" position into the "up" position so that the body 2 is tilted to unload the payload 9.

By loading the payload 9 on the body 2 as described above, the body 2 receives large loads at various parts thereof from the payload 9. The body 2 is, therefore, provided with a variety of stiffening members to prevent the body 2 from deformations or damage such as deflections under the weight of the payload 9. The body 2 has conventionally been constructed of a floor board 2a forming a floor, a front board 2b arranged on a front side of the floor board 2a and forming a front wall, side boards 2c arranged on opposite sides of the floor board 2a and forming side walls, and a canopy 2d arranged on an upper part of the front board 2b. Body structures for dump trucks, which include stiffener ribs and plates arranged as stiffening members, for example, on outer surfaces of these floor board 2a, front board 2b, side boards 2c and canopy 2d, are known (see, for example, Patent Documents 1 and 2).

As illustrated in FIG. 13, the stiffening members in the body structure for the dump truck in the conventional technology including Patent Documents 1 and 2 cited above include two frames 29a (see FIGS. 2 and 3), 29b, which are arranged on the floor board 2a, extend in a longitudinal direction of the body 2, and are placed with an interval therebetween such that they become laterally symmetrical to each other. When the payload 9 is loaded on the body 2 in the "down" position, the load of the payload 9 is applied to the entire floor board 2a, and therefore, the floor board 2a receives a downward force from the payload 9. As the floor board 2a receives at a central part thereof a normal force via the frames 29a, 29b at this time, moments occur at the opposite sides of the floor board 2a so that the floor board 2a tends to undergo a bending deformation in a downward direction. There is, accordingly, a need to secure rigidity sufficiently for the floor board 2a such that the above-mentioned bending deformation can be prevented.

In the conventional technology, the stiffening members in the body structure for the dump truck, therefore, include eight floor-board stiffeners 41-48 arranged on the floor board 2a, which extend in the lateral direction of the body 2 and are placed with intervals in the longitudinal direction of the body 2. The rigidity of the entire floor board 2a is secured by these floor-board stiffeners 41-48 and frames 29a,29b. The stiffening members further include ribs 12, ribs 13, flat plates 14, flat plates 14a, flat plates 15, and flat plates 15a. The ribs 12 are arranged on and along upper edge portions of the side boards 2c. The ribs 13 are arranged extending in parallel with the corresponding ribs 12 on central parts of the side boards 2c from a front of the body 2 toward a rear of the body 2. The flat plates 14 are arranged on front parts of the side boards 2c at locations between the ribs 12 and the ribs 13. The flat plates 14a are arranged to cover spaces defined by these side boards 2c, ribs 12, 13 and flat plates 14. Flat plates 15 are arranged on rear parts of the side boards 2c at locations between the ribs 12 and lower edge portions of the side boards 2c. The flat plates 15a are arranged to cover spaces defined by these side boards 2c, ribs 12, 13 and flat plates 15. By these ribs 12, 13 and flat plates 14, 14a, 15, 15a, the side boards 2c are provided with rigidity.

The stiffening members further include an unillustrated rib, and also, ribs 32a (see FIGS. 2 and 3), 32b. The unillustrated rib is arranged on a central part of the front board 2b, and extends in the lateral direction of the body 2. The ribs 32a, 32b are arranged on the central part of the front board 2b, extend in a vertical direction of the body 2 such that the ribs 32a, 32b intersect at right angles with the unillustrated rib, and are placed in parallel to each other with an interval therebetween in the lateral direction of the body 2. By these ribs, the front board 2b is provided with rigidity. The stiffening members further include ribs 19 arranged on and along opposite sides of the canopy 2d, and by these ribs 19, the canopy 2d is provided with rigidity to increase the strength of the canopy 2d of a cantilever structure. It is to be noted that as described above, FIG. 13 illustrates a left side of the dump truck 1 and neither the frame 29a nor the rib 32a is shown there.

The above-described ribs 12, 13, 19, 32a, 32b and floor-board stiffeners 41-48 and the unillustrated rib in the lateral direction of the front board are each formed to have a substantially "U" shaped cross section, and open end portions of these substantially "U" shaped cross sections are joined to the floor board 2a, front board 2b, side boards 2c and canopy 2d, respectively, by welding or the like, and the floor-board stiffeners 41-48 and frames 29a,29b for the floor board 2a are integrally joined to the floor board 2a by welding or the like. Further, the flat plates 14 for the side boards 2c are joined to the ribs 12, 13 by welding or the like, while the flat plates 14a are joined to the ribs 12, 13, flat plates 14 and side boards 2c by welding or the like. Upper portions of the front parts of the side boards 2c are formed in a box shape by the ribs 12, 13, flat plates 14, 14a and side boards 2c. Likewise, the flat plates 15 are joined to the ribs 12, 13 and side boards 2c by welding or the like, the flat plates 15a are joined to the ribs 12, 13, flat plates 15 and side boards 2c by welding or the like, and the rear parts of the side boards 2c are formed in a box shape by the ribs 12, 13, flat plates 15, 15a and side boards 2c.

CITATION LIST

Patent Literature

[Patent Citation 1] U.S. Pat. No. 6,592,171
[Patent Citation 2] U.S. Pat. No. 6,592,172

DISCLOSURE OF INVENTION

Technical Problem

In the body structure according to the conventional technology constructed as described above, the plural ribs 12, 13, 19, 32a, 32b, floor-board stiffeners 41-48 and flat plates 14, 14a, 15, 15a and the unillustrated lateral rib on the front board 2b are arranged on the body 2 by welding or the like to secure the rigidity of the body 2. The load of the payload 9 loaded on the body 2 is, therefore, applied to weld joints of these ribs 12, 13, 19, 32a, 32b, floor-board stiffeners 41-48, flat plates 14, 14a, 15, 15a and unillustrated lateral rib on the front board 2b, so that stress concentration occurs at the weld joints. To reduce a stress, which is to be applied to each weld joint, to below a corresponding limited stress, it may be contemplated to provide the body 2 with many additional ribs. These additional ribs, however, increase the total weight of the body 2, leading to potential problems that the authorized payload weight of the body 2 may be decreased, the travel fuel economy of the dump truck 1 may be deteriorated, and the service life of tires used at the front wheels 6 and rear wheels 7 may be reduced. There is, hence, an outstanding desire for a body structure for a dump truck, which can secure the rigidity of a body while minimizing an increase in the weight of the body as much as possible.

When the front board 2b receives a lateral load from the payload 9, the maximum load of the payload 9 acts on the front board 2b at a central part thereof which in the lateral direction of the body 2, substantially meets with a barycentric position G of the payload 9. As a result, the front board 2b is subjected at the central part thereof to a larger load, and undergoes a greater quantity of deformation. When each side board 2c receives a lateral load from the payload 9, the maximum load of the payload 9 similarly acts on the side board 2c at the central part thereof which in the longitudinal. direction of the body 2, substantially meets with the barycentric position G of the payload 9. As a result, the side board 2c is subjected at the central part thereof to a larger load, and undergoes a greater quantity of deformation. Therefore, a high stress tends to occur at each of the opposite end portions of the unillustrated lateral rib on the front board 2b and the ribs 13 on the side boards 2c. There is, hence, a need to connect the opposite end portions of the unillustrated lateral rib on the front board 2b and the ribs 13 on the side boards 2c to portions of relatively high rigidity. However, a tail part of the body 2 has an open structure to damp the payload 9, and therefore, the rear parts of the side boards 2c, to which rear end portions of the corresponding ribs 13 are connected, are lower in rigidity than other parts. In the body structure according to the conventional technology, the rear parts of the side boards 2c. are thus formed in box shapes by the ribs 12, 13, flat plates 15, 15a and side boards 2c, respectively, to secure rigidity as mentioned above. This construction has, however, led to an convenience in that the body 2 has an increased total weight.

Because the canopy 2d has a cantilever structure as mentioned above, upper portions of front parts of the side boards 2c, to which front end portions of the ribs 13 are connected, are required to have higher rigidity than other parts. In the body structure according to the conventional technology, the upper portions of the front parts of the side boards 2c are thus formed, like the rear parts of the side boards 2c, in box shapes by the ribs 12, 13, flat plates 14, 14a and side boards 2c, respectively, to secure rigidity. However, this construction has led to a further increase in the total weight of the body 2. As has been described above, the body structure according to the conventional technology is accompanied by a problem in that the body 2 is poor in the layout efficiency of stiffening members and the dump truck 1 is inferior in performance.

With the foregoing circumstances of the conventional technology in view, the present invention has as an object thereof the provision of a body structure for a dump truck, which can secure high rigidity while making the body lighter in weight.

Means for Solving the Problem

According to one aspect of the present invention, there is thus provided a body structure for a dump truck, said body structure being to be used by being mounted on a body frame of the dump truck and being provided with hinge pins to be located toward a rear of the body frame, a body to be tiltably disposed on the body frame via the hinge pins and to be adapted to load payload thereon, and stiffening members arranged on outer surfaces of the body to stiffen the body, and said body being constructed at least of a floor board forming a floor wall, a front board joined to a front side of the floor board to form a front wall, side boards joined to opposite sides of the floor board, respectively, to form side walls, and a canopy joined to an upper part of the front board, characterized in that the stiffening members comprise side-board stiffeners connecting upper portions of elongated joints between the side boards and the front board to portions of elongated joints between the side boards and the floor board, the latter portions being located, rearward of positions laterally corresponding to a bar position of the payload on the body in a longitudinal direction of the body, to stiffen the side boards, respectively.

According to the present invention constructed as described above, the upper portion of the elongated joint between each side board and the front board in the body is provided with relatively high rigidity because the two boards are connected to each other at substantially right angles. Similarly, the elongated joint between each side board and the floor board in the body is provided with relatively high rigidity because the two boards are also connected to each other at substantially right angles. By connecting each side-board stiffener, which stiffens the corresponding side board, at the opposite end portions thereof to the upper portion of the elongated joint between the side board and the front board in the body and the elongated joint between the side board and the floor board, respectively, a quantity of deformation to be produced by loading payload on the body can be controlled such that stresses to be applied to opposite end portions of the side-board stiffener can be controlled well below a limited stress. Further, each side-board stiffener is connected at the lower one of the opposite end portions thereof to the portion of the elongated joint between the corresponding side board and the floor board, said portion being located rearward of the position laterally corresponding to the barycentric position of the payload in the longitudinal direction of the body. The side-board stiffener can, therefore, increase the strength of the side board at the position laterally corresponding to the barycentric position of the payload in the longitudinal direction of the body, that is, around the central part of the side board, thereby making it possible to reduce a load to be applied to the side board under the lateral load of the payload. As a consequence, it is possible to reduce the number of stiffening members needed for the rear part of each side board, and hence, to secure high rigidity while making the body lighter in weight.

Preferably, the side-board stiffeners may be connected to the elongated joints between the side boards and the floor board at portions located between the positions laterally corresponding to the barycentric position of the payload and the hinge pins in the longitudinal direction of the body, respectively. When constructed as described above, it is no longer required to arrange each side-board stiffener extending rearward along the elongated joint between the corresponding side board and the floor board beyond the position ion of the corresponding hinge pin in the longitudinal direction of the body. The total length of each side-board stiffener can, therefore, be made shorter, thereby making it possible to reduce the total weight of the body.

The stiffening members may preferably further comprise canopy stiffeners joined to opposite sides of the canopy to stiffen the canopy, and the side-board stiffeners may preferably be connected to basal end portions of the canopy stiffeners, respectively. When constructed as described above, the basal end portion of each canopy stiffener is firmly fixed by the corresponding side-board stiffener, thereby making it possible to provide the canopy of the cantilever structure with higher strength, and hence, with improved durability.

Preferably, the stiffening members may further comprise floor-board stiffeners arranged on the floor board (62a; 72a) and extending in a lateral direction of the body to stiffen the floor board, the side-board stiffeners may be connected to corresponding end portions of one of the floor-board stiffeners, respectively, and the one floor-board stiffener may extend between the portions located between the positions laterally corresponding to the barycentric position of the payload and the hinge pins in the longitudinal direction of the body. When constructed as described above, the one floor-board stiffener is firmly fixed at the opposite end portions thereof by the corresponding side-board stiffeners, thereby making it possible to prevent the floor board from undergoing a downward bending deformation at the opposite sides thereof under the load of the payload loaded on the body. As a consequence, it is possible to minimize a stress to be applied to the joints between frames, which may be arranged on the floor board in the longitudinal direction of the body, and the floor-board stiffeners.

The stiffening members may preferably further comprise canopy stiffeners joined to opposite sides of the canopy, respectively, to stiffen the canopy, and also, floor-board stiffeners arranged on the floor board and extending in a lateral direction of the body to stiffen the floor board, and the side-board stiffeners may preferably be connected to the basal end portions of the respective canopy stiffeners and may preferably be connected to corresponding end portions of one of the floor-board stiffeners, respectively, and the one floor-board stiffener may preferably extend between the portions located between the positions laterally corresponding to the barycentric position of the payload and the hinge pins in the longitudinal direction of the body. When constructed as described above, the basal end portions of the canopy stiffeners and the opposite end portions of the one floor-board stiffener are firmly together by the corresponding side-board stiffeners, thereby making it possible to provide the entire body with substantially increased rigidity. As a consequence, it is possible to realize providing the body with stable strength, and hence, to effectively prevent the body from being deformed or broken under the load of the loaded payload. The payload can, therefore, be stably transported even if the body receives strong shocks as a result of vibrations of the dump truck during the transport of the payload.

Preferably, the stiffening members may further comprise side-board center stiffeners extending on central parts of the side boards, respectively, from a front of the body toward a rear of the body to stiffen the side boards; and the sideboard stiffeners may be connected to rear end portions of the side-board center stiffeners, respectively. When constructed as described above, each side-board center stiffener can stiffen the corresponding side board at a front part thereof and can also support the corresponding side-board stiffener, thereby making it possible no provide the corresponding side board with further increased rigidity.

The stiffening members may preferably further comprise a front-board stiffener arranged on a central part of the front board and extending in a lateral direction of the body to stiffen the front board, and the front-board stiffener may be connected at opposite ends portions thereof to front end portions of the side-board center stiffeners, respectively. When constructed as described above, the front board can be stiffened by the front-board stiffener, and the front-board stiffener can be firmly fixed at the opposite end portions thereof by the corresponding side-board center stiffeners, thereby making it possible to provide the front board with increased strength, and hence, with improved durability.

The stiffening members may preferably further comprise ribs arranged on and along upper edge portions of the side boards, respectively, and the side-board stiffeners are connected at front end portions thereof to front end portions of the ribs and at rear end portions thereof to corresponding end portions of one of the floor-board stiffeners, respectively, via connecting members, and the one floor-board stiffener extends between the portions located between the barycentric position of the payload and the hinge pins in the longitudinal direction of the body. When constructed as described above, each side-board stiffener and its corresponding rib and floor-board stiffener can be firmly fixed together, thereby making it possible to keep high the rigidity of the entire body even when the side-board stiffeners are formed shorter in length and lighter in weight. It is, therefore, possible to sufficiently reduce a quantity of deformation of the body to be produced upon loading payload on the body.

Preferably, the stiffening members may further comprise ribs arranged on and along upper edge portions of the side boards, respectively, and canopy stiffeners joined to opposite sides of the canopy to stiffen the canopy, the canopy stiffeners may be formed linear at basal end portions thereof, and the side boards may have a height such that the basal end portions of the canopy stiffeners are integrally connected to the ribs, respectively. When constructed as described above, the side boards have a greater height so that the body has a greater payload capacity. Accordingly, greater payload can be stably transported, thereby making it possible to provide the dump truck with higher transport efficiency.

As has been described above, the body can be provided with significantly improved durability performance by effectively arranging the respective stiffening members on the front board and side boards such that the body can be adequately stiffened at its parts to be subjected to lateral loads from payload.

Advantageous Effects of the Invention

The body structure according to the present invention for the dump truck is provided with the hinge pins to be located toward the rear of the body frame, the body to be tiltably disposed on the body frame via the hinge pins and to be adapted to load payload thereon, and stiffening members arranged on the outer surfaces of the body to stiffen the body, and the stiffening members comprise the side-board stiffeners connecting the upper portions of the elongated joints between the side boards and front board of the body to the portions of the elongated joints between the side boards and floor board of the body, the latter portions being located rearward of the positions laterally corresponding no the barycentric position of the payload on the body in the longitudinal, direction of the body, to stiffen the side boards, respectively. Therefore, each side-board stiffener is connected at the opposite end portions thereof to the portions at each of which the corresponding two boards of relatively high rigidity are connected to each other at substantially right angles. Stresses to be applied to the opposite end portions of each side-board stiffener when the payload is loaded on the body can, therefore, be controlled well below a limited stress. Further, the one end portion, specifically the lower end portion of each side-board stiffener is connected to the portion of the elongated joint between the corresponding side board and the floor board, said portion being located rearward of the position laterally corresponding to the barycentric position of the payload on the body in rte longitudinal direction of the body. The side-board stiffener can, therefore, increase the strength of the side board around the central part thereof, thereby making it possible to reduce a load to be applied to the side board under the lateral load of the payload. As a consequence, it is possible to reduce the number of stiffening members needed for the rear part of each side board, and hence, to secure high rigidity while making the body lighter in weight. Because the layout efficiency of the stiffening members on the body can be improved over the conventional technology as described above, the shape and conditions of the body can be stably maintained.

BRIEF DESCRIPTION OF DRAWINGS

FIG. 2 is a front view of a body which the first embodiment of the present invention as illustrated in FIG. 1 is provided with.

FIG. 3 is a bottom view of the body which the first embodiment of the present invention as illustrated in FIG. 1 is provided with.

FIG. 6 is a front view of a body which the second embodiment of the present invention as illustrated in FIG. 5 is provided with.

FIG. 7 is a bottom view of the body which the second embodiment of the present invention as illustrated in FIG. 5 is provided with.

MODES FOR CARRYING OUT THE INVENTION

Embodiments for carrying out the body structure according to the present invention for the dump truck will hereinafter be described based on the drawings.

First Embodiment

Figure 13:
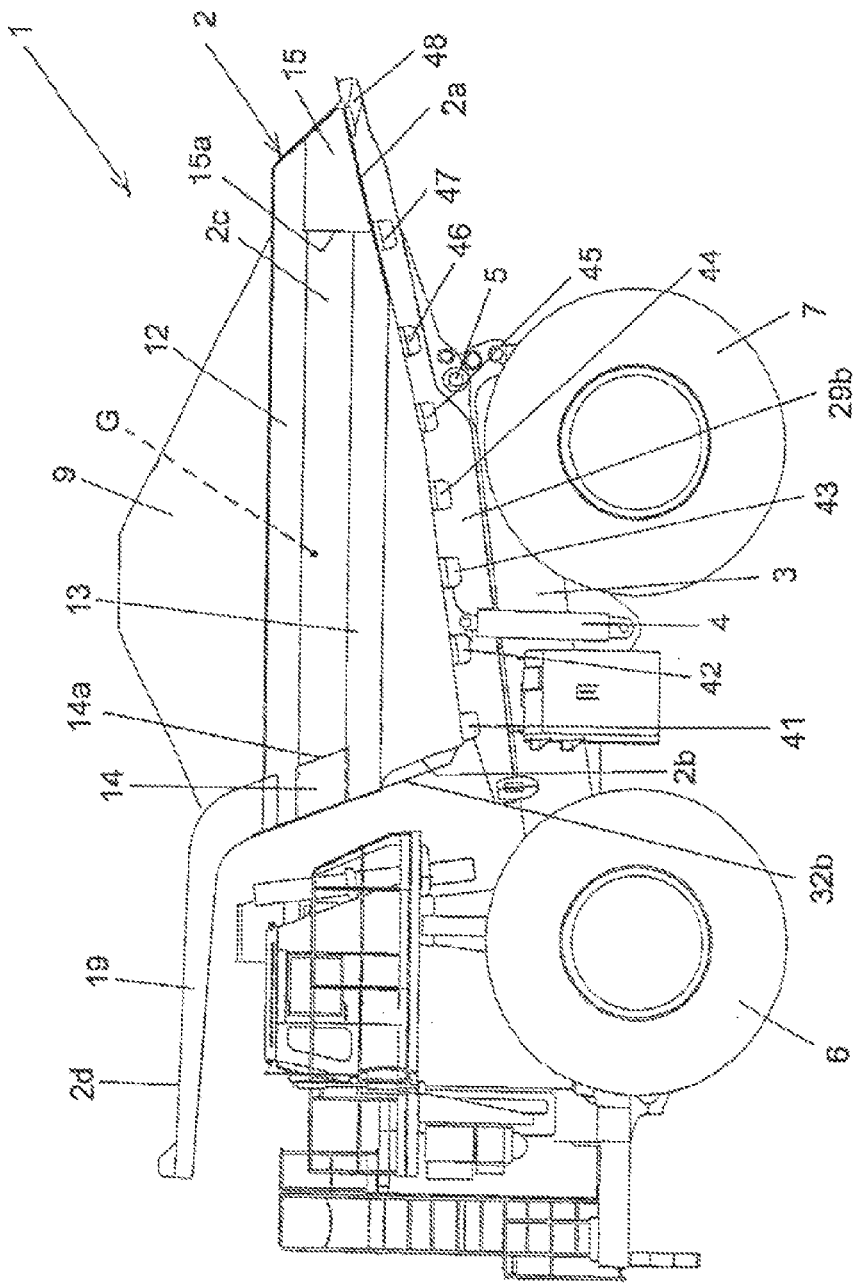
FIG. 13 is a side view illustrating the construction of a conventional body structure for the dump truck.

The basic construction of the body structure according to the first embodiment of the present invention for the dump truck is the same as the above-described body construction for the dump truck as illustrated in FIG. 13. Therefore, like reference numerals are applied to like elements of structure to those in the body structure for the dump truck as illustrated in FIG. 13.

Figure 1:
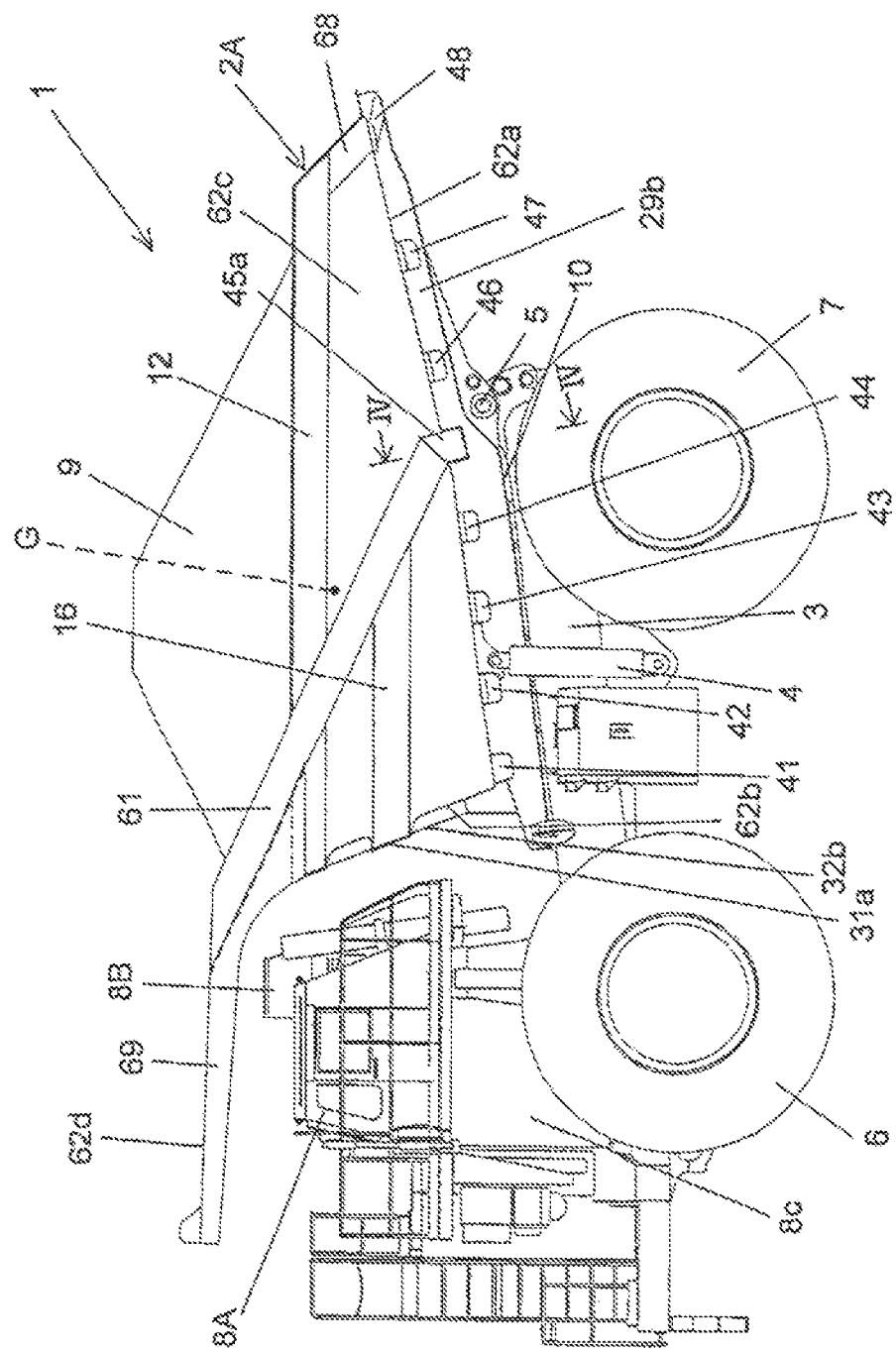
FIG. 1 is a side view illustrating the construction of a body structure according to a first embodiment of the present invention for a dump truck.

As illustrated in FIG. 1, the dump truck 1 to which the body structure according to the first embodiment of the present invention can be applied is provided with the body frame 3, the pair of front wheels 6 rotatably arranged on the opposite lateral ends of the front section of the body frame 3, respectively, the pair of rear wheels 7 rotatably arranged on the opposite lateral ends of the rear section of the body frame 3, respectively, and a body 2A tiltably disposed on the body frame 3 and adapted to load thereon payload 9 such as earth, sand or crushed stone.

Specifically, the dump truck 1 is provided with the hinge pins 5 arranged on the rear section of the body frame 3, and hoist cylinders 4 arranged on the body frame 3 at locations forward of the hinge pins 5 and connecting the body frame 3 and the body 2A with each other. Further, the dump truck 1 is also provided with an operator's cab 8A, a large control box 8B, and a power unit 8c. The operator's cab 8A is disposed above the front wheels 6, and allows an operator to enter it. The control box 8B is arranged on the right side of the operator's cab 8A, and accommodates resistors for dynamic brakes therein. The power unit 8c is arranged on the front section of the body frame 3, and accommodates, for example, hydraulic equipment thereon.

The above-mentioned hydraulic equipment include, for example, an unillustrated hydraulic pump for feeding pressure oil to the hoist cylinders 4 and an unillustrated hydraulic oil reservoir for storing hydraulic oil to be fed to the hydraulic pump. In the dump truck 1, the hydraulic pump in the power unit 8c, therefore, can feed pressure oil from the hydraulic oil reservoir to the hoist cylinders 4, thereby making it possible to extend the hoist cylinders 4 and to raise the body 2A to the "up" position, and can also return the pressure oil, which has been fed to the hoist cylinders 4 by the hydraulic pump in the power unit 8c, to the hydraulic oil reservoir, thereby making it possible to retract the hoist cylinders 4 and to lower the body 2A to the "down" position while supporting the body 2A.

The body structure according to the first embodiment of the present invention for the dump truck is provided with stiffening members arranged on outer surfaces of the body 2A to stiffen the body 2A. The body 2A includes a floor board 62a forming a floor, a front board 62b joined to a front side of the floor board 62a and forming a front wall, side boards 62c joined to opposite sides of the floor board 62a and forming side walls, and a canopy 62d joined to an upper part of the front board 62b. In the first embodiment of the present invention, the joined areas of these floor board 62a, front board 62b and side boards 62c are each formed in an angle shape, and the canopy 62d is formed in a curved shape on the side of its basal end.

In the first embodiment of the present invention, the stiffening members include side-board stiffeners 61, which connect upper portions of elongated joints between the side boards 62c and the front board 62b and portions of elongated joints between the side boards 62c and the floor board 62a each other, the latter portions being located rearward of the positions laterally iv corresponding to the barycentric position G of the payload 9 in the longitudinal direction of the body 2A, to stiffen the side boards 62c. Each side-board stiffener 61 is connected to the portion of the elongated joint between the corresponding side board 62c and the floor board 62a, said portion being located at a position between the position laterally corresponding to the barycentric position G of the payload 9 in the longitudinal direction of the body 2A and the corresponding hinge pin 5.

Figure 3:
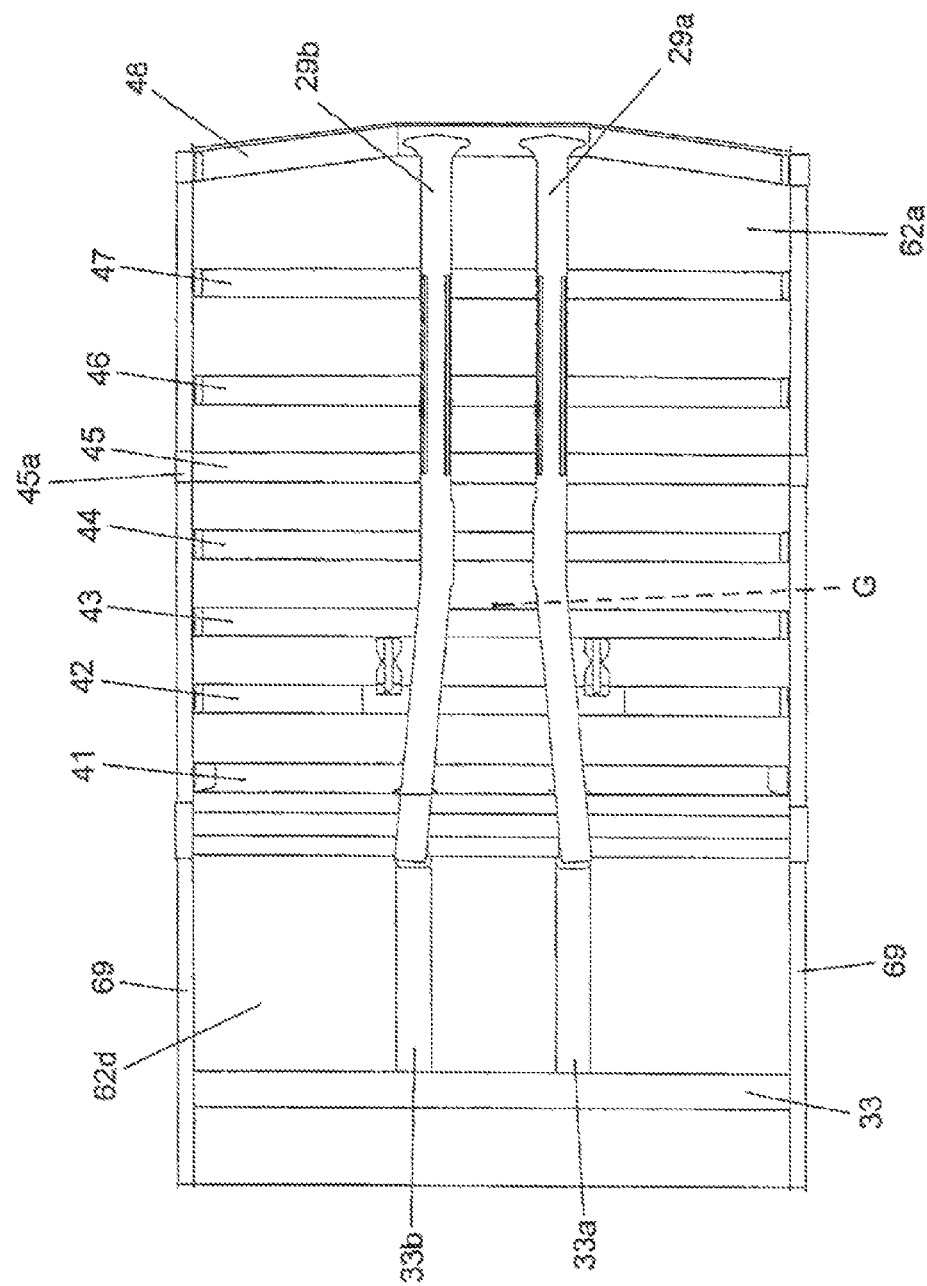
Figure 4:
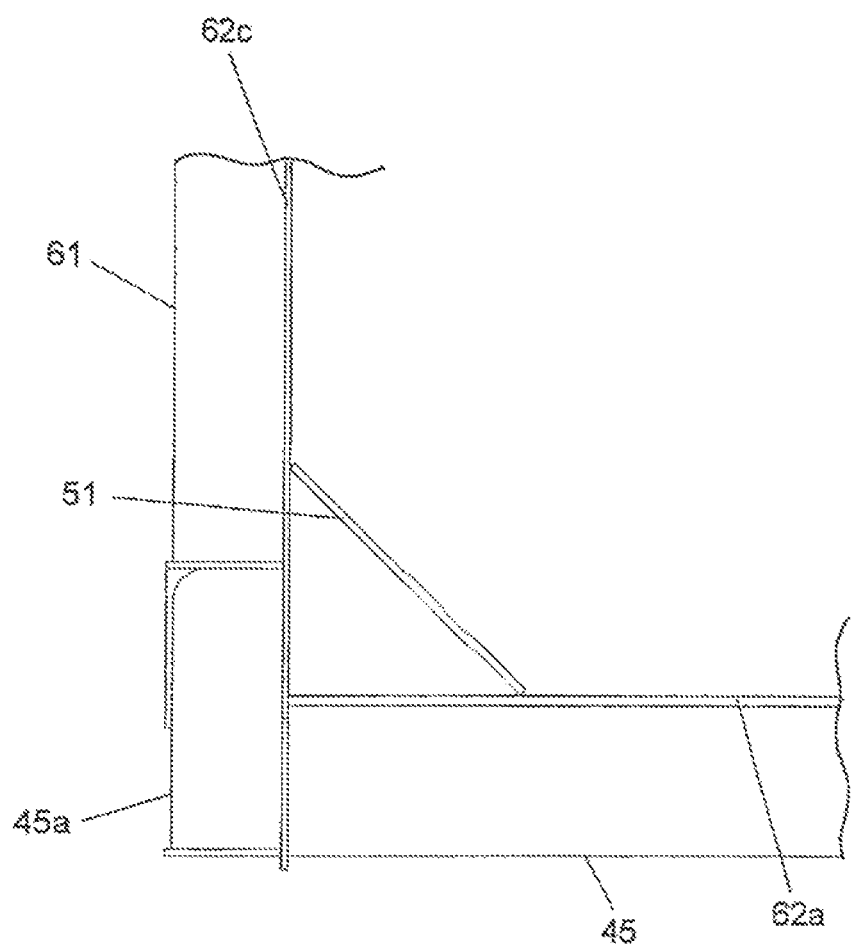
FIG. 4 is a cross-sectional view taken along line IV-IV of FIG. 1, and depicts an essential part of the body.

The stiffening members further include canopy stiffeners 69 joined to opposite sides of the canopy 62d, respectively, to stiffen the canopy 62d, and the side-board stiffeners 61 are connected to rear end portions of the canopy stiffeners 69, respectively. As shown in FIG. 3, the stiffening members further include eight floor-board stiffeners 41-48 provided on the floor board 2a and extending in the lateral direction of the body 2A to stiffen the floor board 62a. These floor-board stiffeners 41-48 are arranged with intervals in the longitudinal direction of the body 2A. As depicted in FIG. 1 and FIG. 4, each side-board stiffener 61 is connected via a connecting member 45a to a corresponding end portion of the floor-board stiffener 45 out of the floor-board stiffeners 41-48.

As shown in FIG. 3, the stiffening members further include two frames 29a, 29b, which are provided on the floor board 62a, extend in the longitudinal direction of the body 2A, and are arranged with an interval therebetween such that they become laterally symmetrical with each other. The frames 29a, 29b are each provided at an outer bottom surface thereof with a cushion member 10 such as a rubber pad to reduce a shock to be received from the body frame 3 when the body 2A is lowered to the "down" position from the "up" position as illustrated in FIG. 1. As shown in FIG. 4, the first embodiment of the present invention prevents the loaded payload 9 from sticking on the body 2A by arranging a plate 51 aslant over a joined area between the floor board 62a and each of the front board 62b and side boards 62c on an inner side of the body 2A.

The stiffening members further include side-board center stiffeners 16, which as illustrated in FIG. 1, are each arranged, on a central part of the corresponding side board 62c, extending from a front of the body 2A toward a rear of the body 2A to stiffen the side board 62c. Each side-board stiffener 61 is connected to a rear end portion of the corresponding side-board center stiffener 16. The stiffening members further include ribs 12 arranged on and along upper edge portions of the side boards 62c, respectively. Each side-board renter stiffener 16 and its corresponding rib 12 are arranged parallel to each other. It is to be noted that each side board 62c is provided at a rear edge portion thereof with a rib 68 that stiffens a rear part of the side board 62c.

Figure 2:
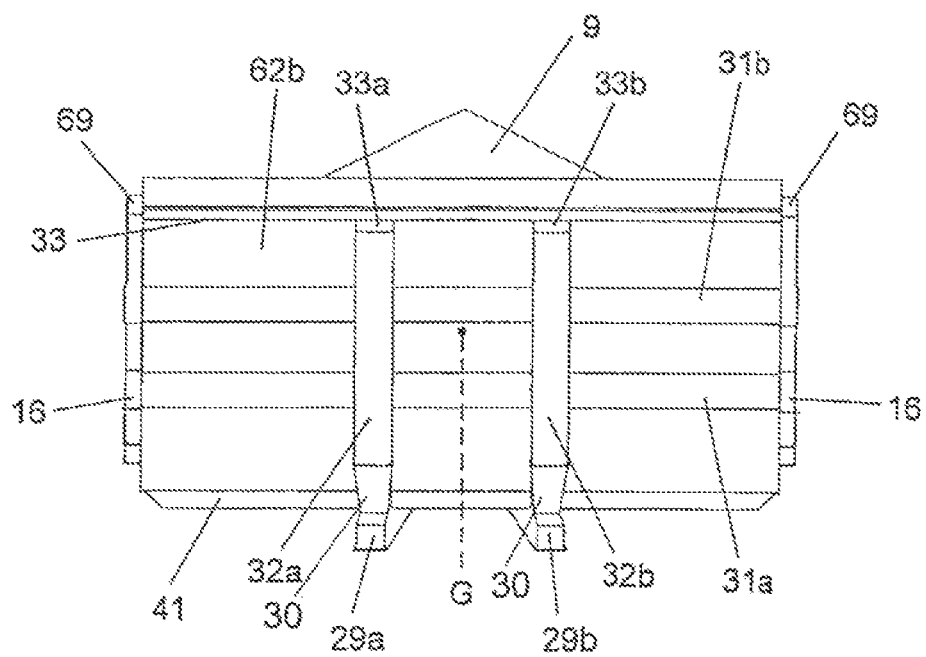

The stiffening members further include front-board stiffening members arranged, on a central part of the front board 62b and extending in the lateral direction of the body 2A to stiffen the front board 62b. As depicted in FIG. 2, these front-board stiffening members consist of ribs 31a, 31b arranged parallel to each other with an interval in a vertical direction of the body 2A, and the rib 31a is connected to front end portions of the respective side-board center stiffeners 16. The stiffening members further include ribs 32a, 32b, which are arranged on the central part of the front board 62b and extend in the vertical direction of the body 2A such that the ribs 32a, 32b intersect, at right, angles with the ribs 31a, 31b. These ribs 32a, 32b are arranged with an interval in the lateral direction of the body 2A and in parallel with each other.

Frames 29a, 29b on the floor board 62a are formed smaller in width than these ribs 32a, 32b. Lower end portions of the ribs 32a, 32b are connected to the frames 29a, 29b on the floor board 62a, respectively, via corresponding tapered connecting members 30 formed with a width that becomes smaller downwardly. As a consequence, the floor board 62a is provided with increased strength, thereby obviating the need for arrangement of frames having a greater width or addition of one or more new frames. It is, therefore, possible to secure high rigidity while still keeping the body 2A light. As depicted in FIG. 2 and FIG. 3, the stiffening members further include a first rib 33 and second ribs 33a, 33b. The rib 33 is arranged on a front part of the canopy 62d, and extends in the lateral direction of the body 2A to stiffen the canopy 62d. The ribs 33a, 33b are arranged on a central part of the canopy 62d, extend in the longitudinal direction of the body 2A, and are placed in parallel to each other with an interval therebetween in the lateral direction of the body 21. Front end portions of these ribs 33a, 33b are connected to the rib 33 and are not arranged extending forward beyond the rib 33. Compared with the case that such ribs would extend forward beyond the rib 33, the ribs 33a, 33b can reduce a weight increase in the body 2A. Further, rear end portions of the ribs 33a, 33b are connected to upper end portions of the ribs 32a, 32b, respectively. The above-described, respective stiffeners 16, 41-48, 61, 69 and ribs 12, 18, 31a, 31b, 32a, 32b, 33, 33a, 33b are each formed, for example, in a substantial "U" shape in cross section, and open end portions of such substantially "U" shaped cross sections are joined by welding or the like to the floor board 62a, front board 62b, side boards 62c and canopy 62d, respectively. Moreover, the floor-board stiffeners 41-48 and frames 29a, 29b on the floor board 62a are integrally connected together by welding or the like.

According to the first embodiment of the present invention constructed as described above, the upper portion of the elongated joint between each side board 62c and the front board 62b in the body 2A is provided with relatively high rigidity because the two boards are connected to each other at substantially right angles. Similarly, the elongated joint between each side board 62c and the floor board 62a in the body 2A is provided with relatively high rigidity because the two boards are also connected to each other at substantially right angles. By connecting the opposite end portions of each side-board stiffener 61, which stiffens the corresponding side board 62c, to the upper portion of the elongated joint between the side board 62c and the front board 62b in the body 2A and to the elongated joint between the side board 62c and the floor board 62a, respectively, a quantity of deformation to be produced by loading the payload 9 on the body 2A can be reduced such that stresses to be applied to the opposite end portions of the side-board stiffener 61 can be controlled well below a limited stress. Further, the lower end portion of each side-board stiffener 61 is connected via the corresponding connecting member 45a to the corresponding end portion of the floor-board stiffener 45 located on the elongated joint between the corresponding side board 62c and the floor board 62a at a position rearward of the position laterally corresponding to the barycentric position G of the payload 9 in the longitudinal direction of the body 2A. Each side-board stiffener 61 can, therefore, increase the strength of the corresponding side board 62c around the central part thereof which in the longitudinal and vertical directions of the body 2A, substantially meets with the barycentric position G of the payload 9, thereby making it possible to reduce a load to be applied to the side board 62c under the lateral load of the payload 9. As a consequence, it is possible to reduce the number of stiffening members needed for the rear part of each side board 62c, and hence, to secure high rigidity while making the body 2A lighter in weight. Because the layout efficiency of the stiffening members on the body 2A can be improved as described above, the shape and conditions of the body 2A can be stably maintained.

In the first embodiment of the present invention, each side-board stiffener 61 is connected, as mentioned above, to the portion of the elongated joint between the corresponding side board 62c and the floor board 62a, said portion being located at the position between the position laterally corresponding to the barycentric position G of the payload 9 and the corresponding hinge pin 5 in the longitudinal direction of the body 21, specifically to the corresponding end portion of the floor-board stiffener 45. Compared with the connection of each side-board stiffener 61, for example, to the corresponding end portion of the floor-board stiffener 46 or 47 located rearward of the position of the corresponding hinge pin 5 in the longitudinal direction of the body 2A, each side-board stiffener 61 can be shortened in total length, thereby making it possible to decrease the total weight of the body 2A. As a consequence, the fabrication cost of the side-board stiffeners 61 can be reduced.

The canopy stiffeners 69 arranged on the opposite sides of the canopy 62d are firmly fixed at the basal end portions thereof by the corresponding side-board stiffeners 61 by connecting the front end portions of the side-board stiffeners 61 to the basal end portions of the canopy stiffeners 69, respectively. Therefore, the canopy 62d of the cantilever structure can be provided with increased strength, and hence, with improved durability. As a consequence, the payload 9 can be stably held by the basal end portion of the canopy 62d even when the payload 9 is loaded in a heap on the body 2A.

The opposite end portions of the floor-board stiffener 45 are firmly fixed by the side-board stiffeners 61, respectively, by connecting the rear end portions of the side-board stiffeners 61 to the corresponding end portions of the floor-board stiffener 45 via the corresponding connecting member 45a. The opposite sides of the floor board 62a can be prevented from undergoing a downward bending deformation under the load of the payload 9 loaded on the body 2A. As a consequence, it is possible to reduce a stress to be applied to the joints between the floor-board stiffeners 41-48 and the frames 29a, 29b, and hence, to prevent the joints from breakage.

The basal end portions of the canopy stiffeners 69 and the opposite end portions of the floor-board stiffener 45 are firmly fixed by the corresponding side-board stiffeners 61, and therefore, these side-board stiffeners 61, canopy stiffeners 69 and floor-board stiffener 45 are integrally connected together, and surround and stiffen the body 2A, thereby making it possible to provide the entire body 2A with substantially increased rigidity. As a consequence, it is possible to realize providing the body 2A with stable strength, and hence, to effectively prevent the body 2A from being deformed or broken under the load of the loaded payload 9. The payload 9 can, therefore, be stably transported even if the body 2A receives strong shocks from the payload 9 as a result of vibrations of the dump truck 1 during the transport of the payload 9. The dump truck 1 can, accordingly, be provided with high reliability for the transport of the payload 9.

It is also possible to stiffen the front parts of the side boards 62c and also to support the side-board stiffeners 61 by extending the side-board center stiffeners 16, which are arranged in parallel with the ribs 12 on the central parts of the side boards 62c, from the front of the body 2A toward the rear of the body 2A and connecting the rear end portions of the side-board center stiffeners 16 to the corresponding side-board stiffeners 61. Stresses to be applied to the opposite end portions of each side-board stiffener 61 can be distributed accordingly. As a consequence, each side-board stiffener 61 can be prevented from undergoing a deformation such as a deflection upon application of the lateral load from the payload 9, and the corresponding side board 62c can be provided with further enhanced in rigidity.

By connecting the opposite end portions of the front-board stiffening member arranged on the central part of the front board 62b and extending in the lateral direction of the body 2A, specifically the rib 31a to the front end portions of the corresponding side-board center stiffeners 16, the opposite end portions of the rib 31a are firmly fixed by the corresponding side-board center stiffeners 16. Therefore, the front board 62b can be provided with increased strength, and hence, with improved durability. By effectively arranging the side-board stiffeners 61, side-board center stiffeners 16 and rib 31 on the front board 62b and side boards 62c to adequately stiffen the body 2A at its parts to be subjected to lateral loads from payload 9 as mentioned above, the body 2A can be provided with significantly improved durability performance. As a consequence, the body 2A can be provided with increased service life, and the dump truck 1 can be used over a long term without replacing the body 2A by a new one.

Second Embodiment

Referring next to FIG. 5 through FIG. 8, a description will hereinafter be made of the construction of a body structure according to the second embodiment of the present invention for the dump truck.

Figure 5:
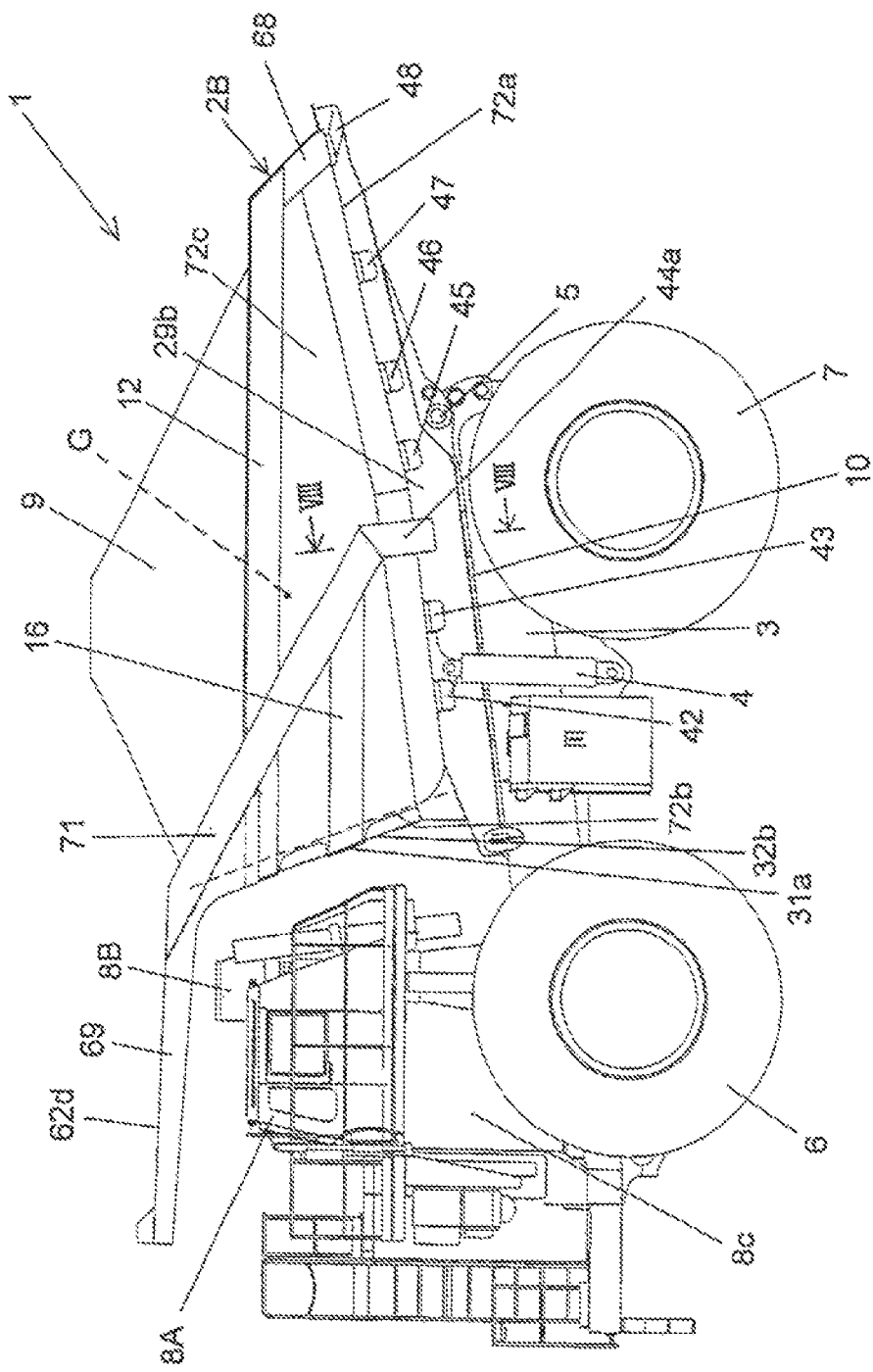
FIG. 5 is a side view illustrating the construction of a body structure according to a second embodiment of the present invention for the dump truck.
Figure 6:
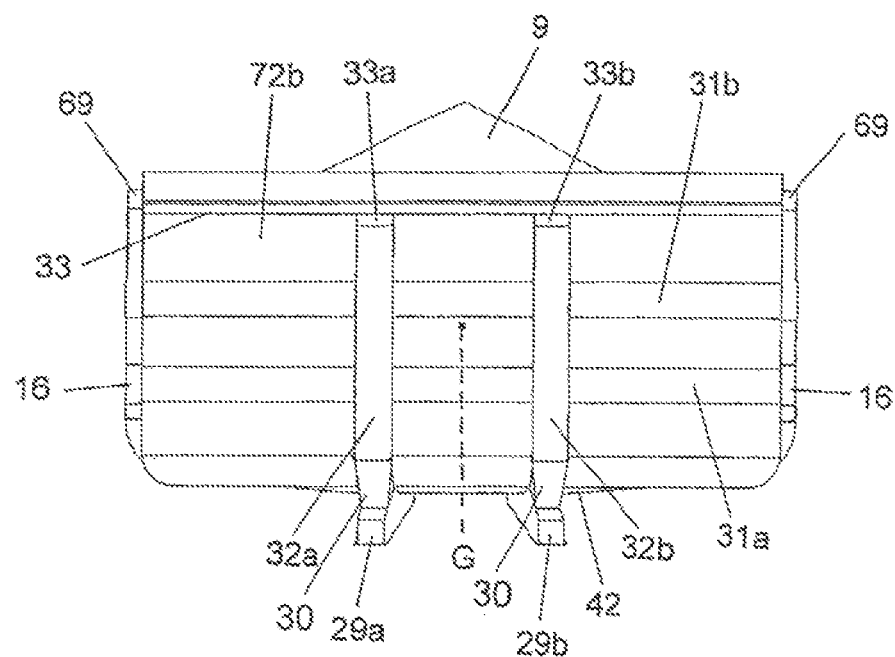
Figure 7:
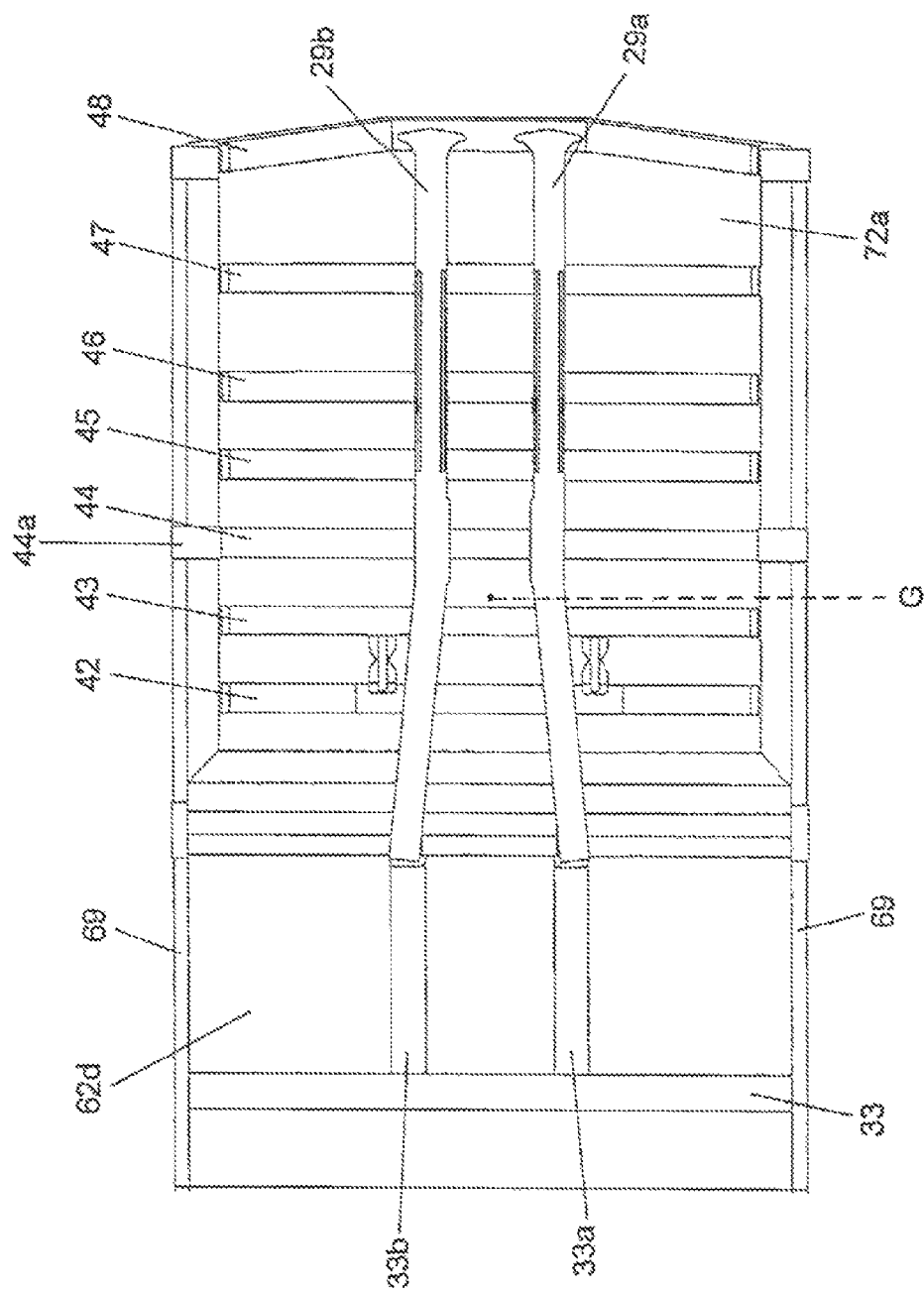

The second embodiment of the present invention is different from the above-described first embodiment in that the joined areas of the floor board 62a, front board 62b and side boards 62c in the body 2A are each formed in the angle shape in the first embodiment while as illustrated, for example, in FIG. 5 and FIG. 6, joined areas of a floor board 72a, front board 72b and side boards 72c are each formed in a curved shape to define a rounded surface in the second embodiment. Further, the floor-board stiffener 41 on the front part of the floor board 62a in the first embodiment is not attached in the second embodiment, and as depicted in FIG. 5 and FIG. 7, each side-board stiffener 71 is connected at a rear end portion thereof to the corresponding end portion of the floor-board stiffener 44 on a floor board 72a via a connecting member 44a. The end portion of the floor-board stiffener 44 is located at a position forward of the corresponding end portion of the floor-board stiffener 45 on the floor board 72a.

Figure 8:
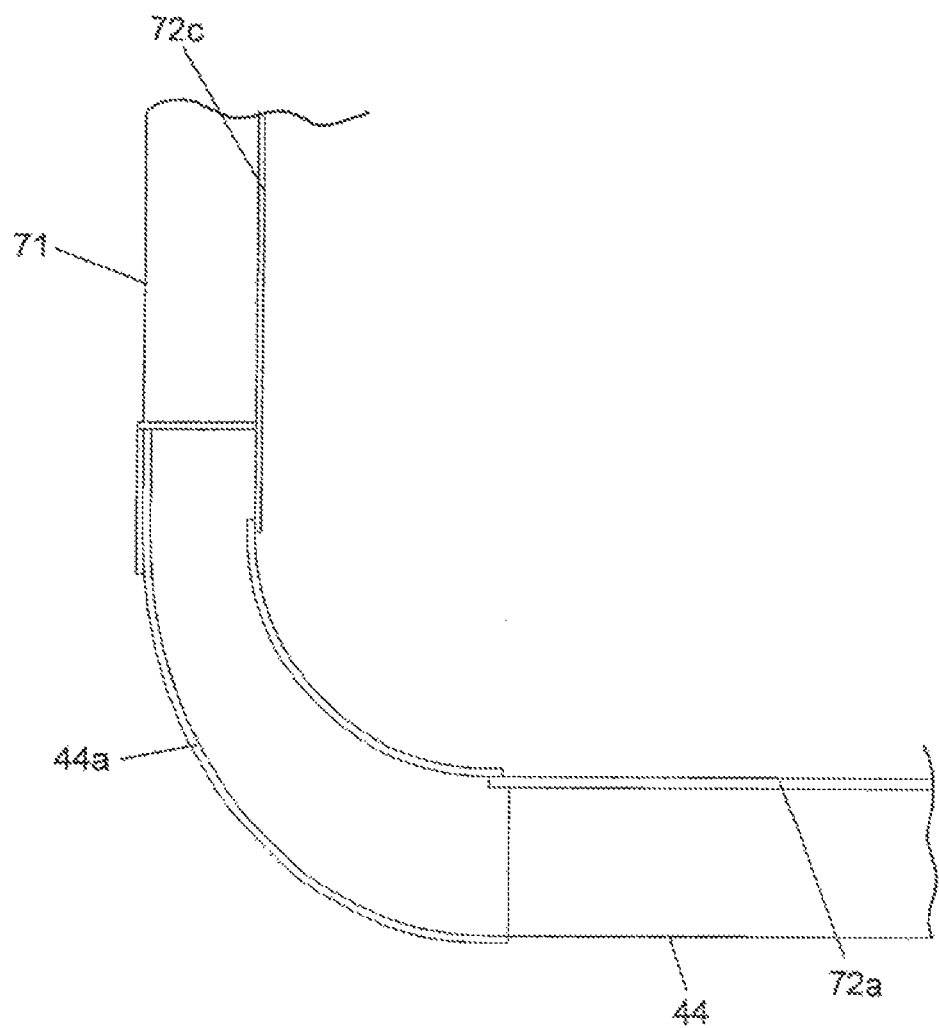
FIG. 8 is a cross-sectional view taken along line VIII-VIII of FIG. 5, and depicts an essential part of the body.

Described specifically, the joined area between the floor board 72a and each side board 72c is formed to define a rounded surface in the second embodiment of the present invention as described above. As shown in FIG. 8, the connecting member 44a, which connects the side-board stiffener 71 and the floor-board stiffener 44 to each other, is hence formed in the shape of a circular arc, and further, the length of the circular arc of the connecting member 44a is set greater than the height of the connecting member 45a as shown in FIG. 4 in connection with the first embodiment. It is to be noted that the plate 51 arranged over the joined area between the floor board 62a and each side board 62c in the first embodiment is not arranged in the second embodiment of the present invention. The remaining construction is the same as the corresponding construction in the first embodiment, and therefore, like reference numerals are applied to like elements of structure to those in the first embodiment.

The second embodiment of the present invention constructed as described above can bring about similar advantageous effects as the above-described first embodiment. In addition, the side-board stiffeners 71 can be made still shorter in total length than the side-board stiffeners 61 in the above-described first embodiment, because the rear end portions of the side-board stiffeners 71 are connected to the corresponding end portions of the floor-board stiffener 44 on the floor board 72a, the latter end portions being located at the positions forward of the corresponding end portions of the floor-board stiffener 45 on the floor board 72a. Further, the joined are of the floor board 72a, front board 72b and side boards 72c are each formed to define the rounded shape, and therefore, the loaded payload 9 can be prevented from sticking even when plates 51 are not arranged inside a body 2B. As a consequence, the total weight of the body 2B can be decreased compared with that of the body 2A in the first embodiment, thereby making it possible to realize providing the body 2B with an increased authorized, payload weight, and hence, to provide the dump truck 1 with improved performance.

Third Embodiment

Figure 9:
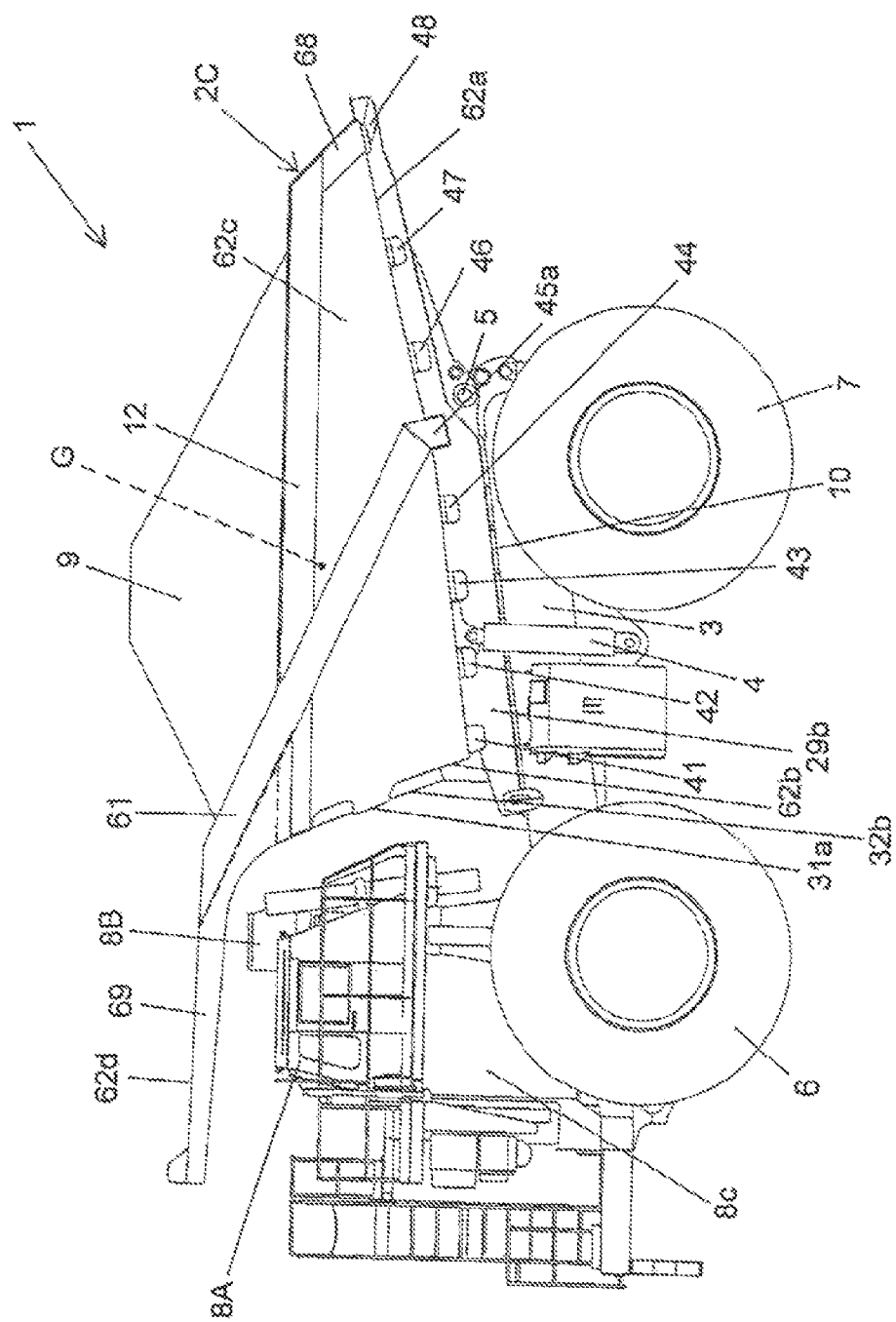
FIG. 9 is a side view illustrating the construction of a body structure according to a third embodiment of the present invention for the dump truck.

With reference to FIG. 9, a description will hereinafter be made of the construction of a body structure according to the third embodiment of the present invention.

The third embodiment of the present invention is different from the above-described first embodiment in that the stiffening members in the first embodiment include the side-board center stiffeners 16 arranged on the central parts of the side boards 62c and extending from the front of the body 2A toward the rear of the body 2A to stiffen the side boards 62c as illustrated in FIG. 1 while stiffening members in the third embodiment do not include the side-board center stiffeners 16 on central parts of the side boards 62c in a body 2C as illustrated in FIG. 9. The remaining construction is the same as the corresponding construction in the first embodiment, and therefore, like reference numerals are applied to like elements of structure to those in the first embodiment.

The third embodiment of the present invention constructed as described above can sufficiently stiffen each side board 62c with only the side-board stiffener 61 and ribs 12, 68 by arranging these three stiffening members at the optimal positions, thereby making it possible to provide the body 2C with a substantially decreased total weight while securing the rigidity of the side boards 62c. As a consequence, the dump truck 1 can be provided with improved travel fuel economy.

Fourth Embodiment

Figure 10:
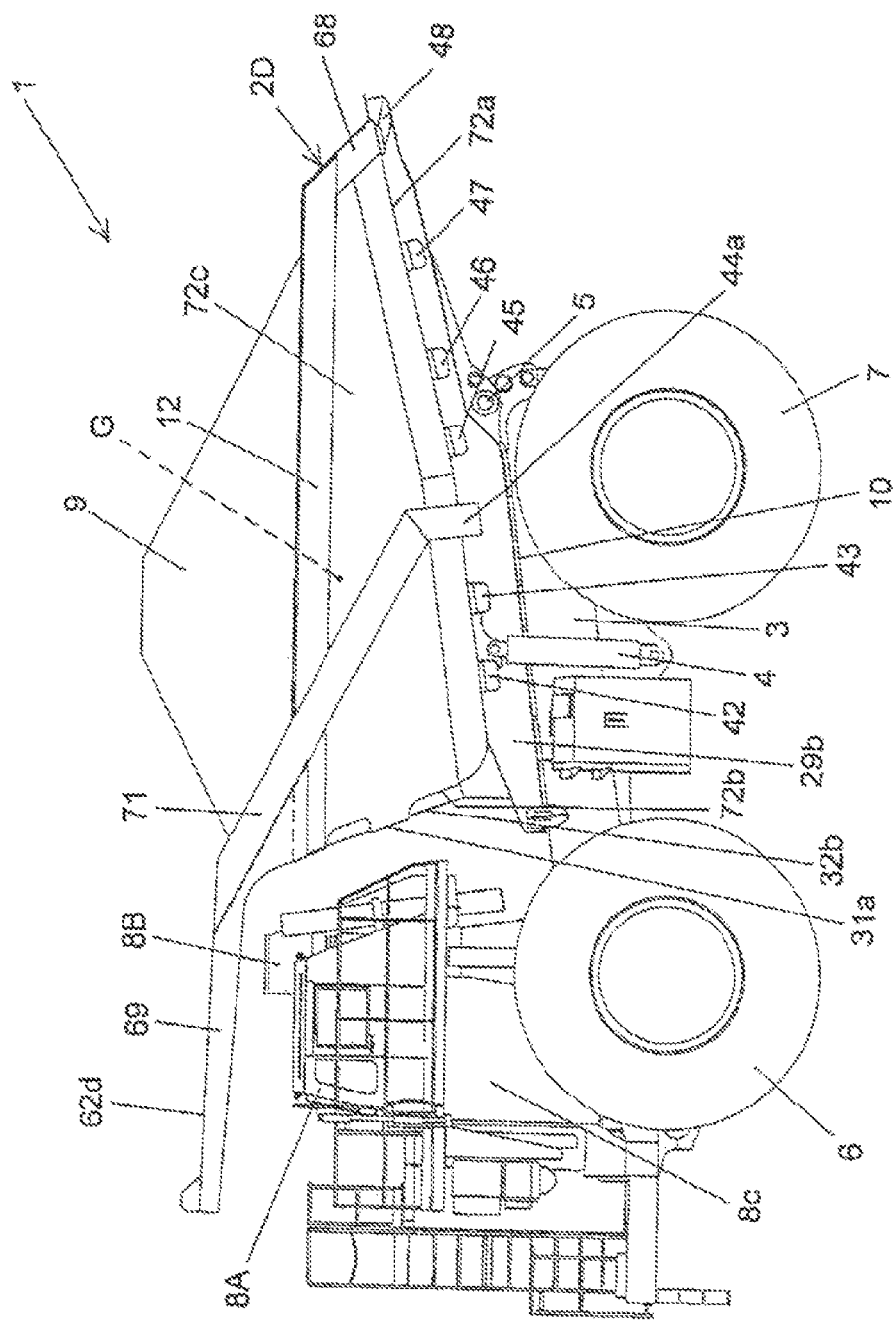
FIG. 10 is a side view illustrating the construction of a body structure according to a fourth embodiment of the present invention for the dump truck.

Referring now to FIG. 10, a description will hereinafter be made of the construction of a body structure according to the fourth embodiment of the present invention.

The fourth embodiment of the present invention is different from the above-described third embodiment in that the joined areas of the floor board 62a, front board 62b and side boards 62c in the body 2C are each formed in the angle shape in the third embodiment as illustrated in FIG. 9 while as illustrated in FIG. 10, joined areas of the floor board 72a, front board 72b and side boards 72c are each formed in a curved shape to define a rounded surface in the fourth embodiment as in the above-described second embodiment. In the fourth embodiment of the present invention, each side-board stiffener 71 is connected at a rear end portion thereof to the corresponding end portion of the floor-board stiffener 44 on the floor board 72a via the connecting member 44a. The end portion of the floor-board stiffener 44 is located at the position forward of the corresponding end portion of the floor-board stiffener 45 on the floor board 72a. Further, neither the floor-board stiffener 41 on the front, part of the floor board 62a nor the plates 51 in the body 2C in the second embodiment are arranged in the fourth embodiment of the present invention. The remaining construction is the same as the corresponding construction in the third embodiment, and therefore, like reference numerals are applied to like elements of structure to those in the third embodiment.

The fourth embodiment of the present invention constructed as described above can prevent the payload 9 from sticking even when plates 51 are not arranged, because the joined areas of the floor board 72a, front board 72b and side boards 72c are each formed to define the rounded shape. As a consequence, a body 2D can be provided with a decreased total weight.

Fifth Embodiment

Figure 11:
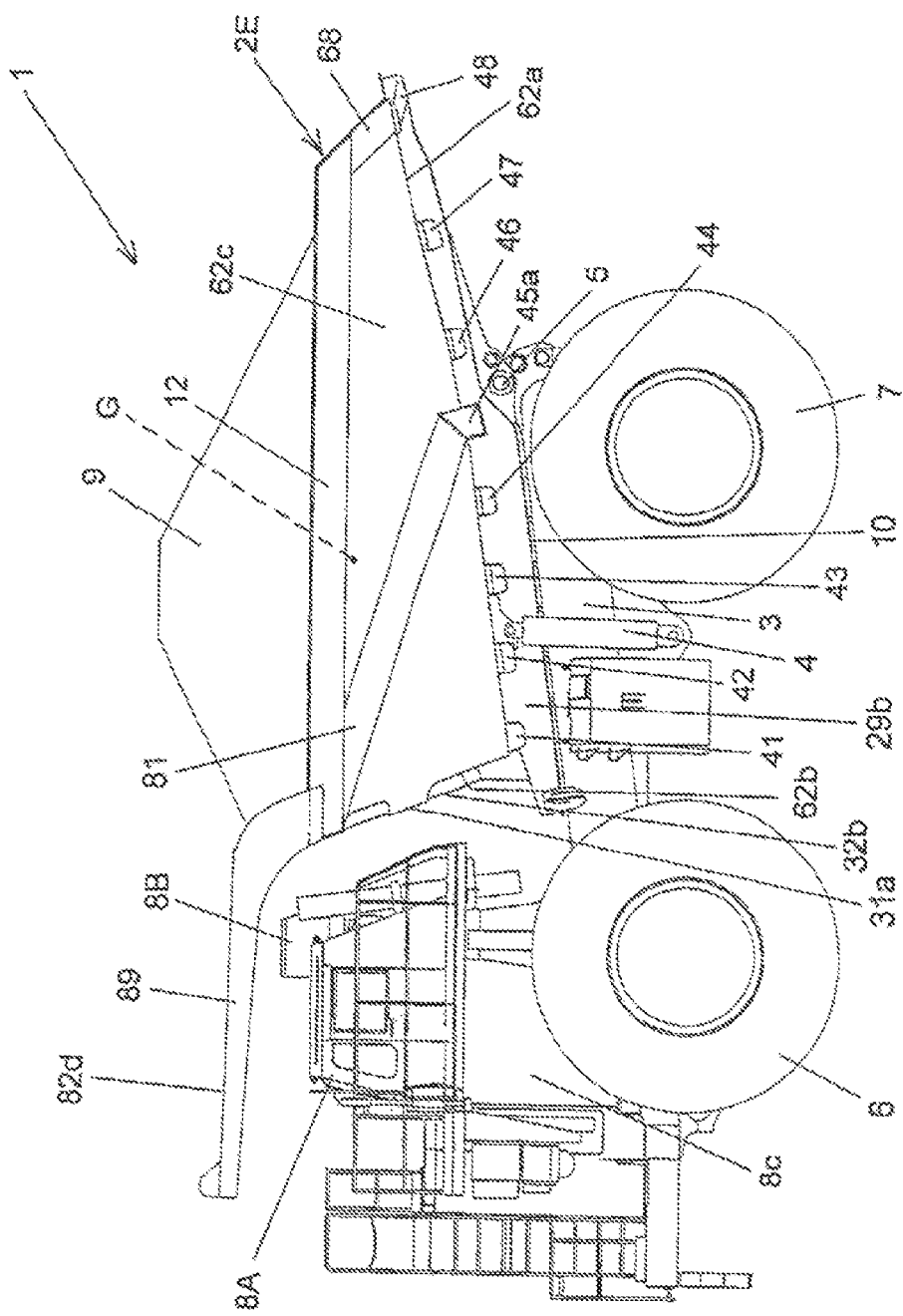
FIG. 11 is a side view illustrating the construction of a body structure according to a fifth embodiment of the present invention for the dump truck.

Referring next to FIG. 11, a description will hereinafter be made of the construction of a body structure according to the fifth embodiment of the present invention.

The fifth embodiment of the present invention is different from the above-described third embodiment in that each side-board stiffener 61 in the third embodiment is connected to the basal end portion of the corresponding canopy stiffener 69 as illustrated in FIG. 9 while each side-board stiffener 81 in the fifth embodiment is connected to the front end portion of the rib 12 arranged on and along the corresponding side board 62c as illustrated in FIG. 11. It is to be noted that each canopy stiffener 89 is formed at a basal end portion thereof in a curved shape in conformity with the shape of the canopy 82d and is connected at the basal end portion thereof to the front end portion of the corresponding rib 12. The remaining construction is the same as the corresponding construction in the third embodiment, and therefore, like reference numerals are applied to like elements of structure to those in the third embodiment.

By connecting the rear end portion of each side-board stiffener 81 to the corresponding end portion of the floor-board stiffener 45 on the floor 62a via the connecting member 45a and connecting the front end portion of the side-board stiffener 81 to the front end portion of the rib 12 arranged on and along the upper edge portion of the corresponding side-board stiffener 62c by welding or the like, the fifth embodiment of the present invention constructed as described above can keep high the rigidity of an entire body 2E, and hence, can sufficiently reduce a quantity of deformation to be produced on the body 2E as a result of loading of the payload 9 on the body 2E, even when the side-board stiffeners 81 are made shorter than the side-board stiffeners 61 in the third embodiment to limit the weights of the side-board stiffeners 81 low.

Sixth Embodiment

Figure 12:
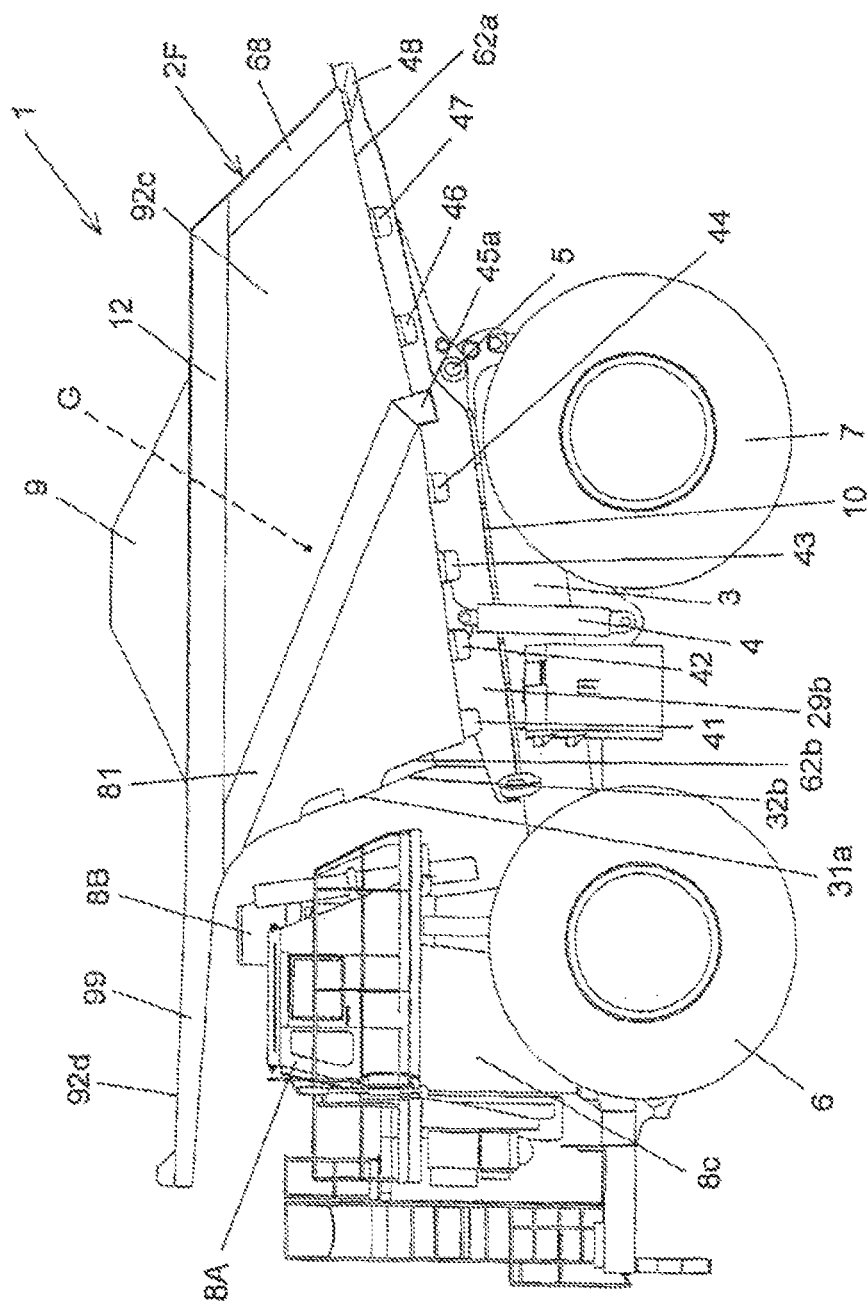
FIG. 12 is a side view illustrating the construction of a body structure according no a sixth embodiment of the present invention for the dump truck.

Referring now to FIG. 12, a description will hereinafter be made of the construction of a body structure according to the sixth embodiment of the present invention.

The sixth embodiment of the present invention is different from the above-described fifth embodiment in that as illustrated in FIG. 11, each canopy stiffener 89 in the fifth embodiment in formed at the basal end portion thereof in the curved shape in conformity with the shape of the canopy 82d and is connected to the front end portion of the corresponding rib 12 while as illustrated in FIG. 12, each side board 92c in the sixth embodiment is set taller than the side board 62c in the fifth embodiment and each canopy stiffener 99 in the sixth embodiment is formed linear at a basal end portion thereof and is integrally connected at the basal end portion thereof to the corresponding rib 12. The remaining construction is the same as the corresponding construction in the fifth embodiment, and therefore, like reference numerals are applied to like elements of structure to those in the fifth embodiment.

The sixth embodiment of the present invention constructed as described above can provide a body 2F with a greater payload capacity by setting each side board 92c taller than the side board 62c in the fifth embodiment. As a consequence, the payload 9 can be stably transported in a greater quantity, thereby providing the dump truck 1 with higher transport efficiency.

EXPLANATION OF REFERENCES

1 Dump truck
2 Body
2A-2F Body
2a Floor board
2b Front board
2c Side board
2d Canopy
3 Body frame
4 Hoist cylinder
5 Hinge pin
6 Front wheel
7 Rear wheel
8A Operator's cab
8B Control box
8c Power unit
9 Payload
10 Cushion member
11 Side-board stiffener
12 Rib
13 Rib
14 Flat plate
14a Flat plate
15 Flat plate
15a Flat plate
16 Side-board center stiffener
19 Rib
29a Frame
29b Frame
31a Rib
31b Rib
32a Rib
32b Rib
33 Rib
33a Rib
33b Rib
41-48 Floor-board stiffener
44a Connecting member
45a Connecting member
51 Plate
61 Side-board stiffener
62a Floor board
62b Front board
62c Side board
62d Canopy
68 Rib
69 Canopy stiffener
71 Side-board stiffener
72a Floor board
72b Front board
72c Side board
81 Side-board stiffener
82d Canopy
89 Canopy stiffener
92c Side board
92d Canopy
99 Canopy stiffener
G Barycentric position of payload

The invention claimed is:

1. A body structure for a dump truck, said body structure being mounted on a body frame of the dump truck, the body structure comprising:
hinge pins located toward a rear of the body frame,
a body tiltably disposed on the body frame via the hinge pins and adapted to load payload thereon,
stiffening members arranged on outer surfaces of the body to stiffen the body, said body being constructed at least of a floor board forming a floor wall,
a front board joined to a front side of the floor board to form a front wall,
side boards joined to opposite sides of the floor board, respectively, to form side walls, and
a canopy joined to an upper part of the front board, wherein the stiffening members comprise:
a pair of liner side-board stiffeners which connect upper portions of elongated joints between the side boards and the front board to portions of elongated joints between the side boards and the floor board, the latter portions being located rearward of positions laterally corresponding to a barycentric position of the payload on the body in a longitudinal direction of the body, at opposite end portions thereof, and continuously formed so as to pass around central parts of the side boards from one side of the opposite end portions thereof toward other sides of the opposite end portions, to stiffen the side boards, respectively, and
side-board center stiffeners which extend on the central parts of the side boards respectively, from a front of the body toward a rear of the body to stiffen the side boards, wherein
the sideboard stiffeners are connected to rear end portions of the side-board center stiffeners, respectively, and
the side-board center stiffeners are formed so as to be located more frontward than the sideboard stiffeners.

2. The body structure according to claim 1, wherein:
the side-board stiffeners are connected to the elongated joints between the side boards and the floor board at portions located between the positions laterally corresponding to the barycentric position of the payload and the hinge pins in the longitudinal direction of the body, respectively.

3. The body structure according to claim 2, wherein:
the stiffening members further comprise canopy stiffeners joined to opposite sides of the canopy to stiffen the canopy, and
the side-board stiffeners are connected to basal end portions of the canopy stiffeners, respectively.

4. The body structure according to claim 2, wherein:
the stiffening members further comprise floor-board stiffeners arranged on the floor board and extending in a lateral direction of the body to stiffen the floor board; and
the side-board stiffeners are connected to corresponding end portions of one of the floor-board stiffeners, respectively, and the one floor-board stiffener extends between the portions located between the positions laterally corresponding to the barycentric position of the payload and the hinge pins in the longitudinal direction of the body.

5. The body structure according to claim 2, wherein:

the stiffening members further comprise canopy stiffeners joined to opposite sides of the canopy, respectively, to stiffen the canopy, and also, floor-board stiffeners arranged on the floor board and extending in a lateral direction of the body to stiffen the floor board; and the side-board stiffeners are connected to basal end portions of the respective canopy stiffeners and are also connected to corresponding end portions of one of the floor-board stiffeners, respectively, and the one floor-board stiffener extends between the portions located between the positions laterally corresponding to the barycentric position of the payload and the hinge pins in the longitudinal direction of the body.

6. The body structure according to claim 2, wherein:

the stiffening members further comprise a front-board stiffener arranged on a central part of the front board and extending in a lateral direction of the body to stiffen the front board; and the front-board stiffener is connected at opposite ends portions thereof to front end portions of the side-board center stiffeners, respectively.

7. The body structure according to claim 2, wherein:

the stiffening members further comprise ribs arranged on and along upper edge portions of the side boards, respectively; and the side-board stiffeners are connected at front end portions thereof to front end portions of the corresponding ribs and at rear end portions thereof to corresponding end portions of one of the floor-board stiffeners via connecting members, respectively, and the one floor-board stiffener extends between the portions located between the positions laterally corresponding to the barycentric position of the payload and the hinge pins in the longitudinal direction of the body.

8. The body structure according to claim 2, wherein:

the stiffening members further comprise ribs arranged on and along upper edge portions of the side boards, respectively, and canopy stiffeners joined to opposite sides of the canopy to stiffen the canopy;

the canopy stiffeners are linear at basal end portions thereof; and the side boards have a height such that the basal end portions of the canopy stiffeners are integrally connected to the ribs, respectively.

9. The body structure according to claim 2, wherein:

the stiffening members further comprise a first rib arranged on the canopy and extending in a lateral direction of the body to reinforce the canopy, and second ribs arranged on the canopy and extending in a longitudinal direction of the body to reinforce the canopy; and front end portions of the second ribs as viewed in the longitudinal direction of the body are connected to the first rib extending in the lateral direction of the body.

10. The body structure according to claim 2, wherein:

the stiffening members further comprise ribs arranged on the front board and extending in a vertical direction of the body to reinforce the front board, and frames arranged on the floor board, extending in a longitudinal direction of the body and formed with a width smaller than the ribs; and lower end portions of the ribs are connected to the frames, respectively, via corresponding tapered connecting members formed with a width that becomes smaller downwardly.

\* \* \* \* \*